(12) United States Patent
Drinkwater

(10) Patent No.: US 6,408,693 B1
(45) Date of Patent: Jun. 25, 2002

(54) FLUID LEVEL INDICATING DEVICE FOR ANY CONTAINER

(76) Inventor: Arthur G. Drinkwater, 95 Bay Dr., Key West, FL (US) 33040

( * ) Notice: Subject to any disclaimer, the term of this patent is extended or adjusted under 35 U.S.C. 154(b) by 6 days.

(21) Appl. No.: 09/679,048

(22) Filed: Oct. 4, 2000

(51) Int. Cl.⁷ .............................. G01F 23/02
(52) U.S. Cl. .......................... 73/323; 141/95
(58) Field of Search ............... 141/198, 98, 333, 141/300, 299, 297, 201, 331, 367, 95; 73/322, 323, 294, 864, 864.63

(56) References Cited

U.S. PATENT DOCUMENTS

| | | | |
|---|---|---|---|
| 1,511,591 A | * 10/1924 | Colligan | .................. 73/864.63 |
| 2,086,645 A | 7/1937 | Staber | |
| 2,333,711 A | * 11/1943 | Dwiggins | ................. 73/864.63 |
| 2,376,459 A | 5/1945 | Stevens | |
| 3,990,307 A | 11/1976 | Guidicelli | |
| 4,198,848 A | 4/1980 | Mealey | |
| 4,343,184 A | 8/1982 | Jaulmes | |
| 4,375,765 A | 3/1983 | From | |
| 4,850,403 A | * 7/1989 | Wiese | .......................... 141/95 |
| 4,901,776 A | * 2/1990 | Attinello | ....................... 141/95 |
| 4,976,297 A | * 12/1990 | Peckels | ......................... 141/95 |
| 5,279,252 A | 1/1994 | Martelly | |
| 5,447,248 A | * 9/1995 | Rodriguez et al. | ........... 116/228 |
| 5,507,326 A | 4/1996 | Cadman et al. | |
| 5,717,383 A | 2/1998 | Dreyer et al. | |
| 5,898,376 A | 4/1999 | Webb | |

FOREIGN PATENT DOCUMENTS

| | | |
|---|---|---|
| EP | 0338400 | 10/1989 |
| GB | 2261952 A | 6/1993 |

* cited by examiner

*Primary Examiner*—Hezron Williams
*Assistant Examiner*—André Jackson
(74) *Attorney, Agent, or Firm*—Richard C. Litman

(57) ABSTRACT

A fluid level indicating device comprises a transparent tube having a venturi section. A light-weight bead is disposed immediately above the venturi section. The transparent tube has a lower end which extends into a container, which container is to be filled with a liquid. The tube's lower end is positioned at the full level of the container. Air rising through the tube and accelerated in the venturi section will cause the bead to move and indicate when fluid is at the level of the end of the tube in the container. In a preferred embodiment of the invention, the tube is coupled to a specially designed funnel.

11 Claims, 2 Drawing Sheets

FLUID LEVEL INDICATING DEVICE FOR ANY CONTAINER

BACKGROUND OF THE INVENTION

1. Field of the Invention

The present invention generally relates to fluid level gauges. More specifically, the present invention is drawn to apparatus which indicates when a container such as the fuel tank of a boat has been filled.

2. Description of the Related Art

Dispensing fluid into a container presents a problem when there are no gauges to indicate when the container is full. This problem occurs often when boaters attempt to fill the fuel tank of a boat. Consequently, the fuel tank is often overfilled, causing gasoline to overflow out of the filler pipe and onto the gunnel or deck. The spilled gasoline damages the finished area around the filler pipe and creates a fire hazard. Overfilling may also contribute to environmental pollution, in that some of the gasoline may spew out of the tank vent and into the water. Further, the loss of costly gasoline makes the joy of boating more expensive than it need be.

An inexpensive, portable, uncomplicated device which could indicate when the gasoline tank or any fluid container is full and which could easily be adapted for use in almost any container-filling situation, would certainly be welcomed in the art.

The prior art is replete with a variety of apparatus for determining the level of fluids in a container. For example U.S. Pat. No. 2,086,645 (Staber) and U.S. Pat. No. 2,376,459 (Stevens) show measuring gauges incorporated as part of the fluid holding tank.

U.S. Pat. No. 3,990,307 (Guidcelli), U.S. Pat. No. 5,507,326 (Cadman et al.), U.S. Pat. No. 5,717,383 (Dreyer et al.), European Patent number 0,338,400, and British Patent number 2,261,952 A employ relatively complicated electrical systems to determine the level of fluid in, a tank.

U.S. Pat. No. 4,198,848 (Mealey) utilizes a bubble system and scale indicator for aligning comparative levels on a bubble pipe with the level of fluid in a tank.

U.S. Pat. No. 4,343,184 (Jaulmes) discloses a spring biased membrane used to determine fluid level.

U.S. Pat. No. 4,375,765 (From) discloses a level indicating device comprising a flexible container and a transparent, flexible tube wherein an equilibrium condition indicates the level of the fluid.

U.S. Pat. No. 5,279,252 (Martelly) employs a back flow preventor and an indicator installed in the surface of a boat for determining the level of fuel in a fuel tank.

U.S. Pat. No. 5,898,376 (Webb) discloses an alarm system permanently fixed to a fuel tank vent pipe. The alarm is actuated when overflow fluid enters the vent pipe.

None of the above inventions and patents, taken either singularly or in combination, is seen to disclose a easy-to-use fluid level indicating device as will subsequently be described and claimed in the instant invention.

SUMMARY OF THE INVENTION

The instant invention comprises a transparent tube having a venturi section formed in an upper portion thereof. A small, light-weight bead is disposed in the tube immediately above the venturi section.

When utilized, the tube is inserted into a container to be filled so that the lower end of the tube is adjacent the top or full-level of the container. When the container is filled with fluid, air in the tube will be compressed and displaced through the tube. The compression and displacement will be such that air. accelerating through the venturi section will cause the bead to move. This movement will indicate to the person dispensing the fluid that the container is full. Thus, the dispensing operation is halted preventing fluid from overflowing from the container.

In a preferred embodiment, the tube is coupled to a funnel, which funnel is provided with a viewing area. The venturi section of the tube is positioned adjacent the funnel's viewing area so that bead movement may be easily seen by the user.

Accordingly, it is a principal object of the invention to provide a device for indicating when a container is filled with fluid.

It is another object of the invention to provide a device for indicating when a fluid container is filled, which device may be portable or permanently installed.

It is a further object of the invention to provide a device for indicating when a fluid container is filled, which device is adapted for use with a specially designed funnel.

Still another object of the invention is to provide a device for indicating when a fluid container is filled, which device is easy to use.

It is an object of the invention to provide improved elements and arrangements thereof for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
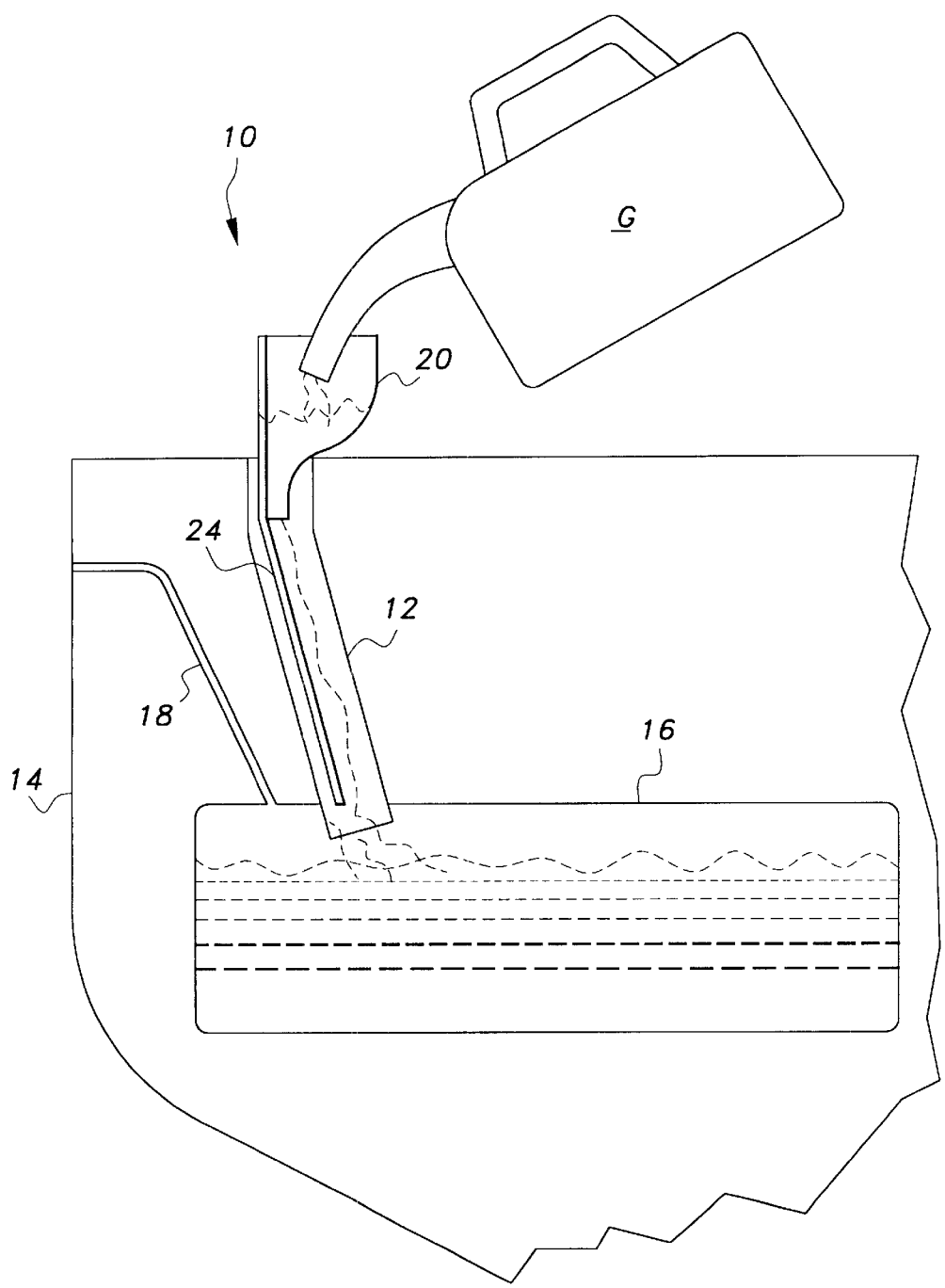
FIG. 1 is an environmental view of a fluid level indicating device according to the present invention.

As illustrated in FIG. 1 the present invention is indicated generally at 10. The invention as shown is inserted in the filler tube 12 of a boat 14. Filler tube 12 extends into gasoline tank 16. A pipe 18 vents tank 16 to the atmosphere. Boat 14, tube 12, tank 16 and vent 18 are conventional and are not part of the instant invention per se. A dispenser G is provided for filling tank 16 with gasoline poured through a funnel 20.

Figure 2:
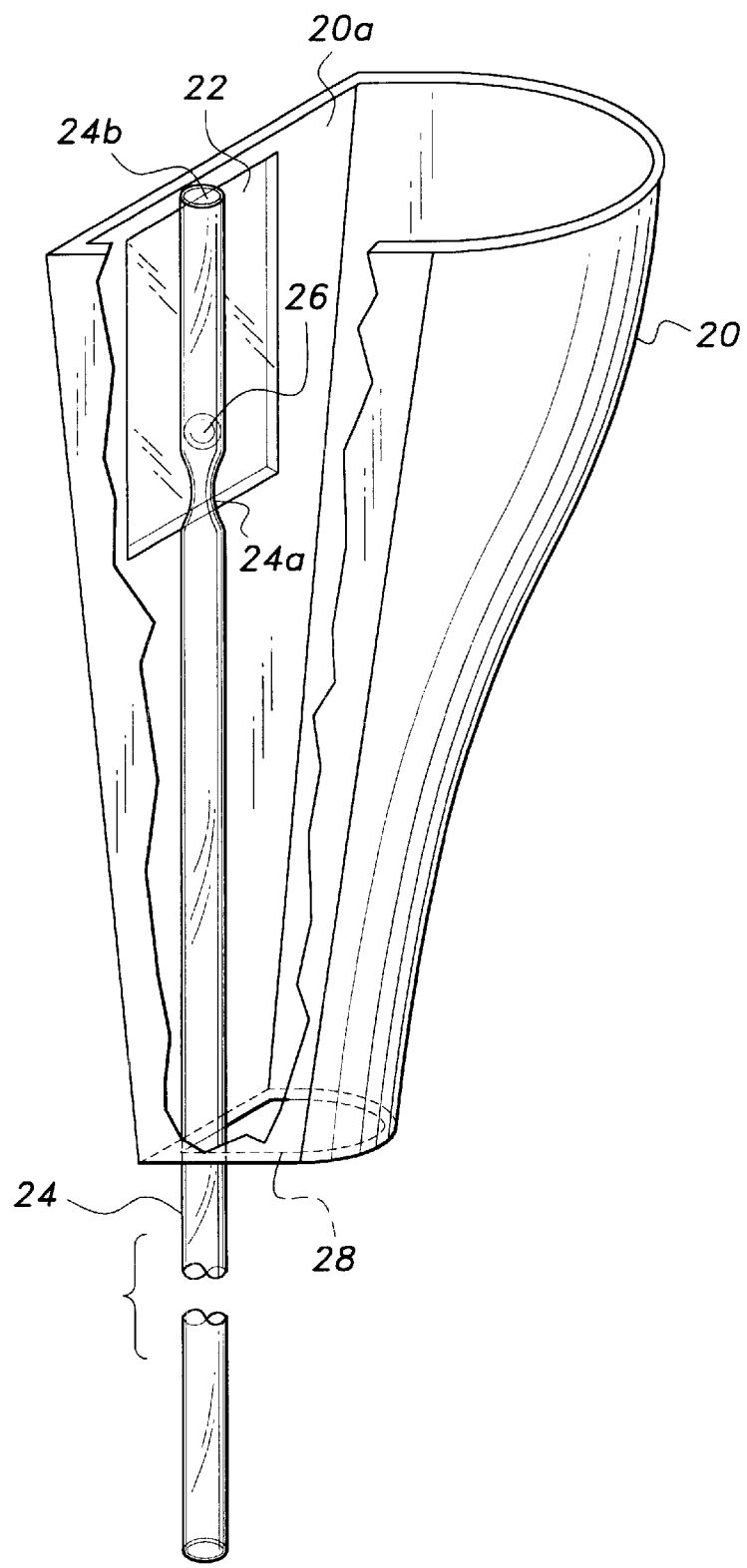
FIG. 2 is a perspective, cut-away view of a fluid level indicating device according to the present invention.

As best seen in FIG. 2 funnel 20 has a wall 20a fashioned with an opening therein. The opening is closed with a transparent plastic or unbreakable glass material 22 such that a viewing area is formed adjacent the upper end of the funnel. The funnel may be fabricated from any suitable material (plastic, metal, etc.). A transparent tube 24 provided with a venturi section 24a is disposed within funnel 20 such that the venturi section can be viewed through transparent material 22. In the preferred embodiment tube 24 is fabricated of any suitable transparent material (plastic, glass, etc.). However, the tube may be fabricated from a metallic or composite material if the venturi section is transparent. Tube 24 may be attached to funnel 20 by any convenient means. A light-weight bead 26 is disposed in tube 24 immediately above venturi section 24a. Bead 26 is fabricated of material which is impervious to various fluids such as gasoline and has a diameter slightly smaller than that of tube 24 so that the bead is allowed to move freely in tube 24. End 24b of tube 24 is partially closed to prevent the bead from falling out. Tube 24 is designed to extend through the lower end of funnel 20 to a point in the filler tube approximately at the top of the boat's fuel tank (see FIG. 1) The funnel is provided with a fuel filter 28.

It is to be understood that the present invention is not limited to the embodiment described above, but encompasses any and all embodiments within the scope of the following claims.

I claim:

1. A fluid level indicating device adapted for insertion into a fluid container to be filled, said device comprising:
    a funnel, said funnel having an upper end, a lower end, an inner surface and an outer surface and a first wall;
    an opening disposed through said first wall;
    an elongated tube, said tube having a first end and a second end;
    said tube positioned on said funnel inner surface; and
    a venturi section formed in said tube adjacent said first end, said tube being transparent at least at said venturi section.

2. A fluid level indicating device as recited in claim 1, wherein a transparent panel is mounted over said opening disposed through said first wall.

3. A fluid level indicating device as recited in claim 2, wherein said first end of said tube is positioned on said funnel inner surface such that said venturi section can be viewed through said transparent panel.

4. A fluid level indicating device as recited in claim 3, wherein said venturi section has an upper end;
    a light-weight bead disposed in said tube, said bead disposed adjacent said upper end of said venturi.

5. A fluid level indicating device as recited in claim 4, wherein said first end of said tube is partially closed.

6. A fluid level indicating device as recited in claim 5, wherein said second end of said tube extends beyond said lower end of said funnel.

7. A fluid level indicating device as recited in claim 6, including a filter disposed in said funnel at said lower end.

8. A fluid level indicating device as recited in claim 7, wherein said tube is fabricated from a plastic material.

9. A fluid level indicating device as recited in claim 7, wherein said tube is fabricated from a glass material.

10. A fluid level indicating device as recited in claim 8, wherein said funnel is fabricated from a plastic material.

11. A fluid level indicating device as recited in claim 8, wherein said funnel is fabricated from a metallic material.

* * * * *